United States Patent Office 3,297,750
Patented Jan. 10, 1967

3,297,750
PROCESS FOR THE PRODUCTION OF N,N',N''-TRIORGANO-SUBSTITUTED BORAZOLES
Elmar-Manfred Horn, Aachen, and Konrad Lang, Leverkusen, Germany, assignors to Farbenfabriken Bayer Aktiengesellschaft, Leverkusen, Germany, a corporation of Germany
No Drawing. Filed Sept. 12, 1963, Ser. No. 308,331
Claims priority, application Germany, Aug. 24, 1961, F 34,767; Sept. 15, 1962, F 37,815
3 Claims. (Cl. 260—551)

This application is a continuation-in-part application of copending application Ser. No. 218,866, filed August 23, 1962.

The present invention relates to an improved process for the production of borazoles carrying organic substituents on the nitrogen atoms, said borazoles having the general formula

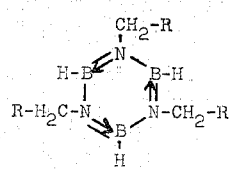

wherein R represents a member selected from the group consisting of aliphatic hydrocarbon radicals, cycloaliphatic hydrocarbon radicals, aromatic hydrocarbon radicals and organically substituted derivatives thereof.

Substituted borazoles are of technical importance. The may be employed for instance as additives to fuels and lubricants, as starting materials for the production of high molecular weight polymers containing boron, which exhibit neutron absorbing properties. Therefore there is a high demand for an economical process to prepare the aforesaid substituted borazoles.

Accordingly, it is an object of this invention to provide a novel process for the preparation of N,N',N''-triorgano-substituted borazoles. Another object of the present invention is to provide a process for the production N,N',N'' - triorgano - substituted borazoles without employing the poisonous diborane. Still another object of the present invention is to provide a process of producing the borazoles in high yields and in a high degree of purity.

These and other objects will be described in the following description.

It is known to prepare N,N',N''-triorgano-B,B',B''-trihydrido-borazoles of the above general formula by a process which requires starting materials sensitive to air and moisture.

There is also known a process which can only be carried out in certain expensive solvents, such as, polyethylene-glycol-dialkyl ethers. Thus, for example, U.S. Patent 2,945,882 describes the reaction of N,N',N''-triphenyl-B,B',B''-trichloroborazole with lithium aluminum hydride which is extremely sensitive to moisture, whilst in accordance with J. Am. Chem. Soc. 76, 3303 (1954), the reaction of B,B',B''-trichloroborazole with lithium borohydride proceeds with the formation of 0.5 mol of diborane per mol of lithium borohydride:

(1) $3LiBH_4 + Cl_3B_3N_3H_3 \rightarrow H_3B_3N_3H_3 + 1.5B_2H_6 + 3LiCl$

Diborane is not only intensely poisonous, but it also often ignites in air. In accordance with J. Am. Chem. Soc. 82, 89 (1960), the reaction of N,N',N''-trisubstituted B,B',B''-trichloroborazoles with sodium borohydride in tri- and diethylene-glycol dimethyl ethers also takes place by analogy with Equation 1, i.e. with diborane elimination.

According to another process which has been described more recently (J. Inorg. and Nuclear Chem., 12 (1960), pages 380–381) the diborane which has been split off can be intercepted by the addition of a trialkyl amine, but in this case the borazane formed has to be worked up in a cumbersome manner to obtain borohydride so that the economy of the process is not too much impaired.

According to J. Am. Chem. Soc. 77, 864 (1955), N,N',N''-trialkyl-borazoles can be produced in diethyl ether by the reaction of monoalkyl-ammonium halides with lithium borohydride, e. g. in accordance with (2):

(2) $3(RNH_3)Cl + 3LiBH_4 \rightarrow H_3B_3N_3R_3 + 8H_2 + 3LiCl$ but this method not merely requires high temperatures as well as involving the difficulty of manipulating lithium borohydride in addition to ether, but moreover only 25% of the hydrogen present in the borohydride is recovered as N,N',N''-trialkyl-B,B'B''-trihydrido-borazole since the remainder escapes as gaseous hydrogen.

According to U.S. Patent 2,892,869 borazoles carrying halogen substituents on the boron atoms and carrying hydrocarbon radicals on the hydrogen or the nitrogen atoms can be reacted with alkali metal hydrides or alkali metal alkyls to yield borazoles which are substituted on the nitrogen and the boron atoms. This process however is troublesome, since the corresponding borazoles have to be prepared in a previous step.

In J. Am. Chem. Soc., No. 6 (1960), pages 2614–2617, Eméleus and Wade teach the production of N,N',N''-triorgano-B,B',B''-trihydrido borazoles by reacting nitriles and diborane. This process however suffers from the disadvantage that the desired B-N-derivatives are produced only in the reaction of the starting products at temperatures substantially far below —100° C. and by subsequently carefully heating for some days, whereas vigorous decomposition occurs when the temperature is raised rapidly. It is further known to produce diborane from sodium borohydride and boron trifluoride etherate (compare Kirk-Othmer, Encyclopaedia of Chemical Technology, 2 (1948), pages 593–595).

In accordance with the invention it has been found that N,N',N''-triorgano-B,B',B''-trihydrido borazoles of the general formula

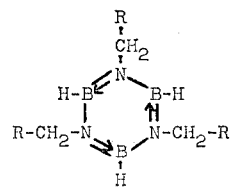

can be produced by mixing a complex metal hydride of the group consisting of alkali metal borohydride, alkaline earth metal borohydride, alkali metal aluminum hydride, alkaline earth metal aluminum hydride with carboxylic acid nitrile of the general formula R—CN, wherein R represents a member selected from the group consisting of alkyl, halogen-substituted alkyl, alkoxy-substituted alkyl, aryl-substituted alkyl, aryloxy-substituted alkyl, cycloalkyl, aryl, halogen-substituted aryl, alkyl substituted aryl, alkoxy-substituted aryl, aryloxy-substituted aryl groups and a boron compound selected from the group consisting of boron trihalides and boron trihalide addition compounds with ethers, mixing being effected at a temperature above 0° C. under anhydrous conditions.

In a specific embodiment of the invention the new process is carried out by reacting the complex metal hydride with an addition compound of a boron trihalide with the aforesaid nitriles.

Preferably the reaction is performed at a temperature between +40° C. and about 100° C.

When using acetonitrile, sodium borohydride and borontrifluoride tetrahydrofuran as starting materials, the process according to the invention can be represented by equation (3):

(3) $12CH_3C\equiv N + 9NaBH_4 + 12BF_3\cdot THF \rightarrow$
$4H_3B_3N_3(C_2H_5)_3 + 9NaBF_4 + 12THF$ (THF=tetrahydrofuran)

Thus, no diborane is formed during the reaction, and moreover the hydride hydrogen present in the borohydride is quantitatively utilized for the hydrogenation of the employed nitriles and for the formation of the N,N'N''-triorgano-B,B',B''-trihydrido-borazoles.

In the process according to the invention the following starting materials may be used:

Aliphatic nitriles such as acetonitrile, propionitrile, butyronitrile and the nitriles of the octane-, dodecane-, and hexa-decane-carboxylic acids;

Cycloaliphatic nitriles such as hexahydrobenzoic acid nitrile;

Aromatic nitriles such as benzoic acid nitrile, α-naphthonitrile, β-naphthonitrile;

Halogen-substituted aliphatic nitriles such as 2-chloropropionitrile, 3-chloropropionitrile, 4-chlorobutyronitrile;

Alkoxy-substituted aliphatic nitriles such as 2-butyropropionitrile, 3-methoxy-propionitrile;

Aryl-substituted aliphatic nitriles such as benzyl-cycloamide, phenyl-propionitrile;

Aryloxy-substituted aliphatic nitriles such as γ-phenoxy butyric acid nitrile;

Halogen-substituted aromatic nitriles such as 2-chlorobenzonitrile, 3-bromo-benzonitrile, 2.4-dichloro-benzonitrile, 2.3.5-trichloro-benzonitrile;

Alkyl-substituted aromatic nitriles such as 4-methyl-benzonitrile, 3-methyl-benzonitrile, 4.6-dimethyl-benzonitrile;

Alkoxy-substituted aromatic nitriles such as 2-methoxybenzonitrile;

Aryl-substituted aromatic nitriles such as 4-cyano-diphenyl;

Aryloxy-substituted aromatic nitriles such as 4-cyanodiphenyl ether;

Boron halides of the general formula $BX_3$, wherein X represents a member of the group consisting of F, Cl, Br and I; addition compounds of boron halides with ethers such as diethyl ether, dimethyl ether and tetrahydrofuran; addition compounds of boron halides with nitriles such as defined above;

Complex metal hydrides selected from the group consisting of alkali metal borohydrides and alkali metal aluminum hydrides.

For reason of economy it is preferred to employ boron trifluoride or its addition compounds.

Also by virtue of economic considerations, it is preferred to use alkali metal borohydrides or alkali metal aluminum hydrides, particularly the cheap sodium borohydride or sodium aluminum hydride which is also readily obtainable; however, other borohydrides or aluminohydrides are also susceptible of reaction.

The use of solvents or suspension agents, e.g. ethers such as tetrahydrofuran, or hydrocarbons, constitutes an advantage, but other solvents or suspension agents inert towards the reaction partners may also be employed.

The present process is preferably carried out at temperatures above 0° C., preferably between +40° C. and +100° C. The lower reaction temperatures permit the process to be performed without the application of pressure; however, it is also possible to operate under pressure, e.g. under nitrogen pressure.

The reaction in accordance with the invention is surprising to the extent that it is known from J. Am. Chem. Soc., page 2614 (1960), for the adduct obtained at low temperatures from, e.g., propionitrile and diborane, to decompose "violently in a vacuum when warmed rapidly to room temperature, leaving a pale brown amorphous solid" which contains carbon, hydrogen, nitrogen, and boron. N,N',N''-tri-n-propyl-B,B',B''-trihydrido-borazole is formed only when the propionitrile borane addition compound prepared at −132° C. is decomposed with care over a period of 5 days.

The process according to the invention represents a technical advance in several respects. The previous processes for the production of N,N',N''-triorgano-B,B',B''-trihydrido-borazoles described at the present state of the art, which pass either via the intermediate stage of N,N',N''-triorgano-B,B',B''-trichloro borazoles or via organic substituted ammonium salts, necessitate expensive solvents, high temperatures, and/or they produce diborane as an undesirable dangerous by-product. On the other hand, the process according to the invention permits the production of the said borazoles in high yields from readily available and cheap starting materials under gentle and easily controlled reaction conditions, whereby a quantitative utilization of the hydride hydrogen employed in the form of borohydride or aluminohydride is achieved for the first time.

The following examples illustrate the invention:

Example 1

$12CH_3C\equiv N + 12BF_3\cdot THF + 9NaBH_4$
$\rightarrow 4(C_2H_5)_3N_3B_3H_3 + 9NaBF_4 + 12THF$ 246 grams (=6 mols) of acetonitrile are added in an atmosphere of protective gas to a suspension of 204 grams (5.4 mols) of sodium borohydride in 2 litres of anhydrous tetrahydrofuran, in a round-bottomed flask provided with a stirrer, reflux condenser, dropping funnel, and immersed thermometer, and 840 grams (6 mols) of the addition compound of boron trifluoride with tetrahydrofuran are then added dropwise to this reaction mixture, slowly during about 2 hours so that moderate boiling of the contents of the flask under reflux is maintained. Subsequently, it is heated to boiling under reflux for another 2 hours, in order to complete the reaction, it is cooled down, sodium tetrafluoroborate is filtered off, the filter residue is rinsed with tetrahydrofuran, and the tetrahydrofuran is distilled off from the filtrate at normal pressure. N,N',N''-triethyl-B,B',B''-trihydrido-borasole, identified by its infra-red spectrum, is obtained by fractionation of the residue in vacuum at a yield of 81.5%, in addition to small amounts of polymeric borazoles.

Example 2

$12C_2H_5\equiv N + 12BF_3\cdot THF + 9NaBH_4$
$\rightarrow 4(n-C_3H_7)_3N_3B_3H + 9NaBF_4 + 12THF$ In the apparatus described above, 220 grams (4 mols) of propionitrile are added in an atmosphere of protective gas to a suspension of 124.8 grams (3.3 mols) of sodium borohydride in 2 litres of anhydrous tetrahydrofuran, and 560 grams (4 mols) of the addition compound of boron trifluoride with tetrahydrofuran are added dropwise to the reaction mixture within about 1.5 hours, so that the temperature of the reaction mixture amounts to about 60–70° C. towards the ends of the addition of boron trifluoride-tetrahydrofuran addition compound. After boiling under reflux for two hours, the reaction product is worked up as described in Example 1, and N,N',N''-tri-n-propyl-B,B',B''-trihydrido-borazole, identified by its infrared spectrum, is obtained by fractionation in vacuum at a yield of 89.9% in addition to small amounts of polymeric borazoles.

Example 3

$12C_2H_5C\equiv N\cdot BF_3 + 9LiAlH_4 \xrightarrow{THF} 4(n-C_3H_7NBH)_3 + 9LiF + 9AlF_3$ A solution of 246 grams (2 mols) of the addition compound of propionitrile with boron trifluoride in 144 grams of tetrahydrofuran is added dropwise, under argon as protective gas, to a cooled solution of 63 grams (1.66 mol)

of lithium aluminum hydride in 2.7 litres of absolute tetrahydrofuran in a round-bottomed flask provided with a dropping funnel, immersed thermometer, stirrer, and reflux condenser during about 30 minutes. The reaction mixture is then warmed to boiling under reflux for 2 to 2.5 hours with vigorous stirring. After cooling, the lithium fluoride-aluminum fluoride mixture is separated by centrifuging, the residue after centrifuging is warmed to boiling under reflux with 600 ml. of dry tetrahydrofuran, whilst stirring, and it is centrifuged again. The solvent is distilled off from the combined tetrahydrofuran solutions at normal pressure, and N,N',N''-tri-n-propyl-B,B',B''-trihydrido-borazole, identified by its infra-red spectrum, is obtained by fractionation in vacuum at a yield of 80%, in addition to small amounts of polymeric borazoles.

*Example 4*

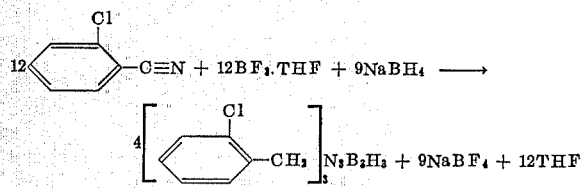

In the apparatus described in Example 1, 550 grams (4 mols) of o-chloro-benzonitrile are added in an atmosphere of protecting gas to a suspension of 125.5 grams (3.3 mols) of sodium borohydride in 3.5 litres of anhydrous tetrahydrofuran and 560 grams (4 mols) of boron-trifluoride with tetrahydrofuran are added dropwise to the addition compound of the mixture with stirring within about two hours so that slight boiling under reflux occurs towards the end of the addition of $BF_3.THF$. The contents of the flask is then heated to boiling under reflux for about another four hours, and the reaction mixture is worked up as described in the preceding examples. After recrystallizing from ligroin, N,N',N''-tri-(o-chloro-benzyl)-B,B',B''-trihydrido - borazole, which is obtained in a yield of 86% and is identified by its infra-red spectrum, melts at 103° C.

*Analysis.*—Calculated: B, 7.13%. Found: B, 7.1%.

In the foregoing description the principle and mode of practicing the invention was described, but within the scope of the appended claims, the invention may be practiced otherwise than as specifically described.

*Example 5*

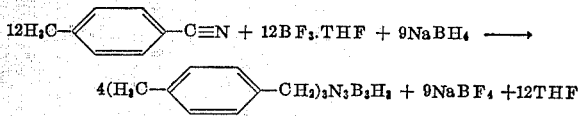

117 grams (1 mol) of p-tolunitrile are added to a suspension of 32 grams (0.84 mol) of sodium borohydride in 1 litre of dry tetrahydrofuran; 140 grams (1 mol) of boron trifluoride-tetrahydrofuran are then added dropwise into the mixture with stirring within about 35 minutes so that moderate boiling under reflux is reached towards the end of the addition of $BF_3.THF$. The reaction is completed by refluxing the reaction mixture for about 3 hours, cooling, filtering, thoroughly washing the filtration residue with tetrahydrofuran and distilling the THF from the filtrate at atmospheric pressure. The resulting product which is obtained in a yield of 98.5% and is identified by the infra-red spectrum to be N,N',N''-trihydrido borazole melts at 111° C. after recrystallizing from hexane. The determination of the molecular weight by the mass spectrum showed a value of 393 mass units.

*Analysis.*—Calculated: B, 8.24%; N, 10.7%. Found: B, 8.27%, 8.28%; N, 10.4%.

*Example 6*

$$12ClCH_2CH_2C\equiv N+12BF_3\cdot THF+9NaBH_4$$
$$\rightarrow 4(ClCH_2CH_2CH_2)_3N_3B_3H_3+9NaBF_4+12THF$$

Following the recipe of the preceding examples N,N',N''-tri-(γ-chloro-propyl)-B,B',B'' - trihydrido borazole is obtained in form of a colorless oil in a yield of 98% from 358 grams (4 mols) of trichloro-propionitrile, 560 grams (4 mols) of boron trifluoride-tetrahydrofuran and 125 grams (3.3 mols) of sodium borohydride. The oil which is identified by the infra-red spectrum, no longer can be distilled at a pressure of about 1 atmosphere.

$d_{20}^4 = 1.120$; $\eta_{20°} = 864$ cp.

*Analysis.*—Calculated: 0.96% hydrogen (bound in hydride form). Found: 1.0% hydrogen (bound in hydride form).

We claim:

1. N,N',N''-tri-(o-chloro-benzyl) - B,B',B''-trihydrido-borazole.
2. N,N',N''-tri-(p-methyl-benzyl) - B,B',B''-trihydrido-borazole.
3. N,N'N''-tri-(γ-chloro-propyl) - B,B',B'' - trihydrido-borazole.

References Cited by the Examiner

Brown et al.: J. Am. Chem. Soc., vol. 80, pp. 1552–58, April 1958.

Brown et al.: J. Am. Chem. Soc., vol. 82, pp. 681–86, February 1957.

Brown et al.: J. Org. Chem., vol. 22, pp. 1135–36, February 1957.

Cotton et al.: Advanced Inorganic Chemistry: A Comprehensive Text (1962), p. 190.

Emeleus et al.: Chem. Soc. J. (London), pp. 2614–7 (1960).

Gaylord: Reduction With Complex Metal Hydrides, 95–103 (1956), Interscience Publishers Inc.

WALTER A. MODANCE, *Primary Examiner.*

H. I. MOATZ, *Assistant Examiner.*